Jan. 12, 1960  J. J. KUESER  2,921,173
WARMING BLANKET CONTROL
Filed July 23, 1956  3 Sheets-Sheet 1

Inventor
John J. Kueser
by Bair, Freeman & Molinare
Attorneys

Jan. 12, 1960 J. J. KUESER 2,921,173
WARMING BLANKET CONTROL
Filed July 23, 1956 3 Sheets-Sheet 2

Inventor
John J. Kueser
by Bair, Freeman & Molinare
Attorneys

Inventor
John J. Kueser
by Bain, Freeman & Molinare
Attorneys

United States Patent Office 2,921,173
Patented Jan. 12, 1960

2,921,173

WARMING BLANKET CONTROL

John J. Kueser, St. Louis, Mo., assignor to Knapp-Monarch Company, St. Louis, Mo., a corporation of Delaware Application July 23, 1956, Serial No. 599,375

9 Claims. (Cl. 219—20)

This invention relates generally to temperature control devices and more specifically to such devices adapted for primary and secondary control of electric warming blankets and the like.

It is known to provide temperature sensitive devices for controlling at a remote point the temperature of an electric blanket, heating pad or the like. Such devices conventionally comprise a thermostat operated primary control adapted to repeatedly open and close the power circuit to the electric blanket for enabling a desired average blanket temperature to be maintained. Additionally, it is known to provide these devices with a differential relay secondary control adapted to cut off the power to the electric blanket in the event the blanket overheats due to the malfunctioning of a circuit component or for any other reason.

It is an object of this invention to provide an improved secondary temperature control for an electric warming blanket, which secondary control continues to cycle on and off after initial cut-off caused by blanket overheat. By comparison, secondary controls have been provided in the prior art which remain in the cut-off condition for an indefinite period of time after a temporary overheating and thereby permit the blanket to cool, a condition which frequently has resulted in factory return of the blanket for servicing.

It is another object of this invention to provide an improved electric blanket temperature control in which several primary and secondary control functions are provided for by only a single element. Thus, the improved control not only is more simple and less expensive to manufacture, but is safer due to the reduction of vulnerable parts, that is, parts which require electrical connections and/or pressure contacts and, therefore, are sources of possible trouble.

It is still another object of this invention to provide an improved electric blanket temperature control which enables the blanket to heat regardless of the sequence of connection by the user of the source of power, blanket, and control therefor. More specifically, the improved temperature control is error-proof in the sense of providing heat whether the user connects the power plug to an outlet before or after the blanket plug is connected. Thus the difficulty encountered in prior art types of temperature controls, whereby no blanket heating action takes place unless all connections are made prior to switching the control switch to the "On" position, has been eliminated.

It is a further object of this invention to provide an improved electric blanket temperature control in which the thermal primary control section and the differential relay secondary control section each may be calibrated without removing the control chassis from its housing.

It is a still further object of this invention to provide an improved electric blanket temperature control which is adapted to be used either alone for heating an entire blanket, or together with a second similar control for sharing temperature control of the same electric blanket, each control governing one-half of the electric blanket.

With these and other objects in view, the invention consists in the construction, arrangement, and combination of the various parts of the heating blanket control whereby the objects contemplated are obtained as hereinafter more fully set forth, pointed out in the claims and illustrated in the accompanying drawing, wherein:

Figure 7:
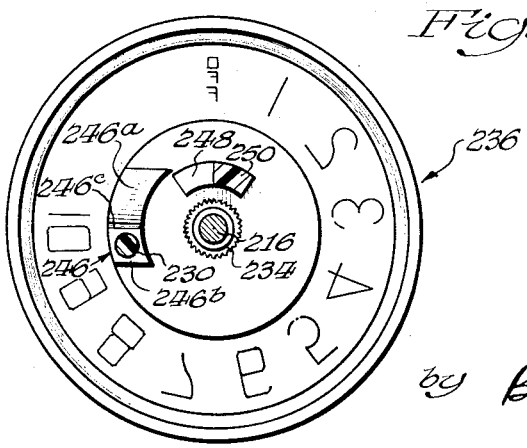
Figure 2:
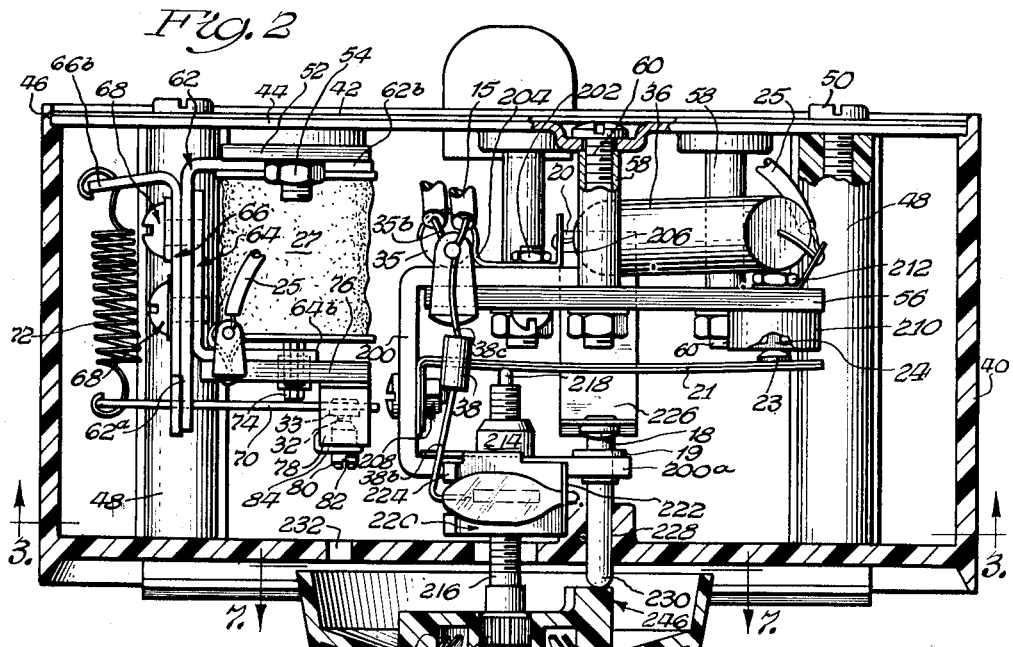
Figure 2 is a plan sectional view of a temperature control unit embodying the invention.
Figure 3:
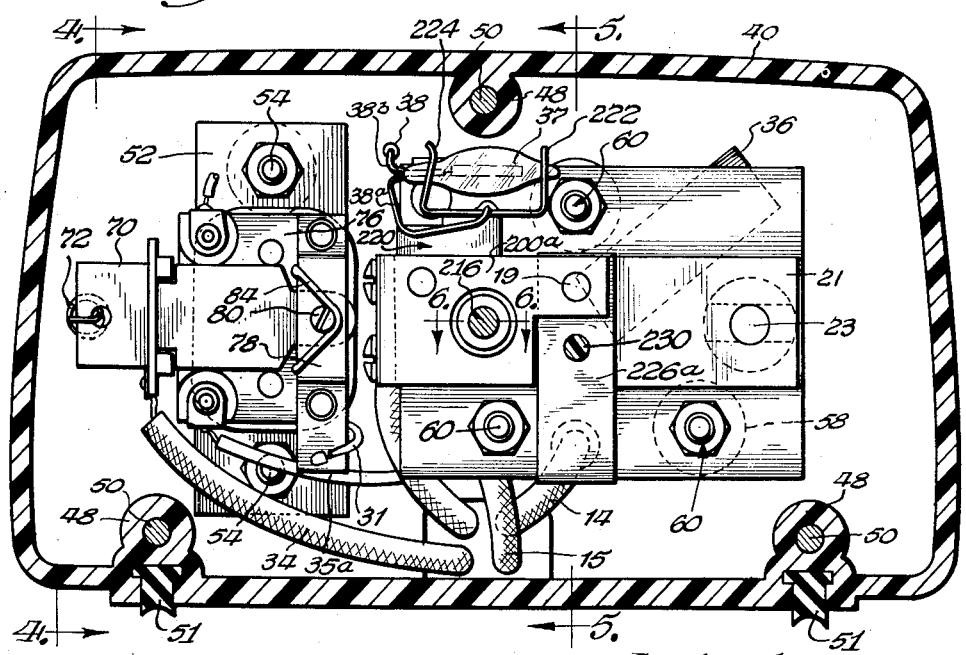
Figure 3 is an elevational sectional view taken along line 3—3 of Figure 2.
Figure 4:
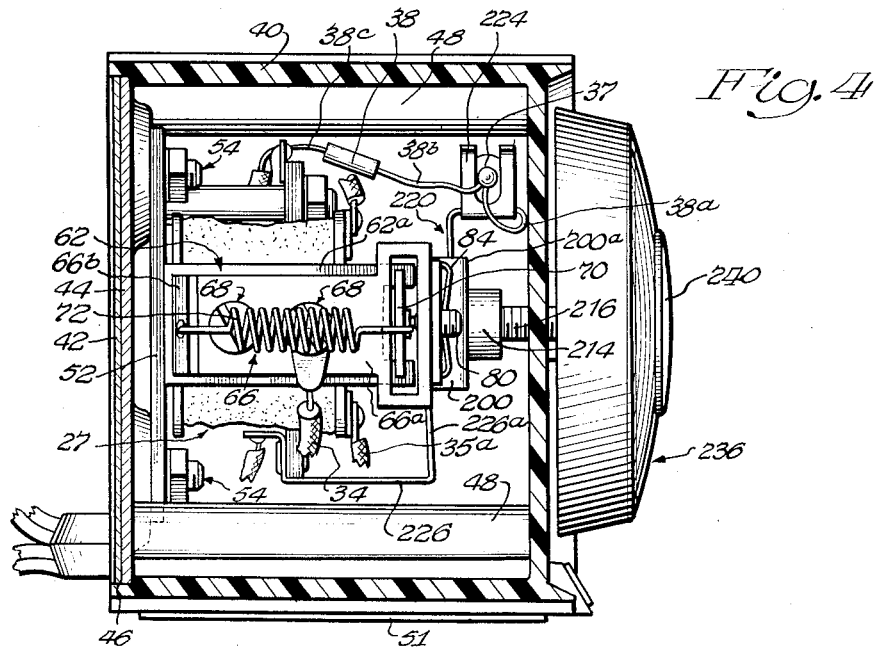
Figure 5:
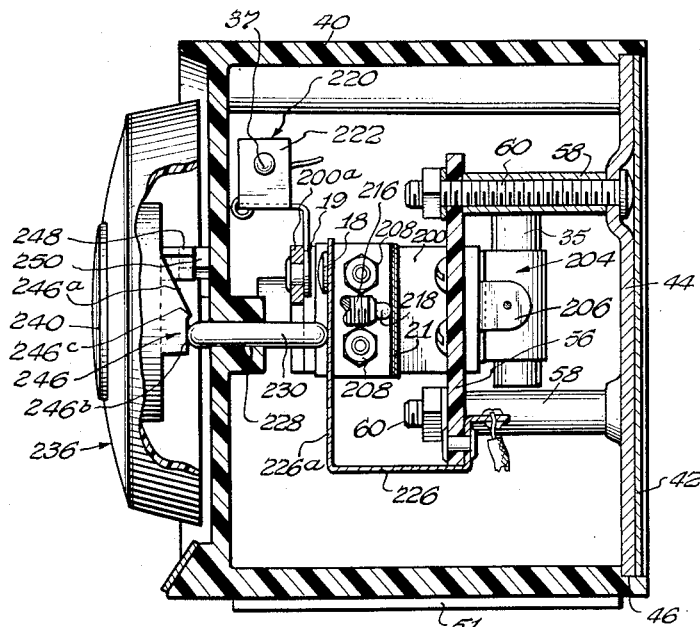
Figure 6:
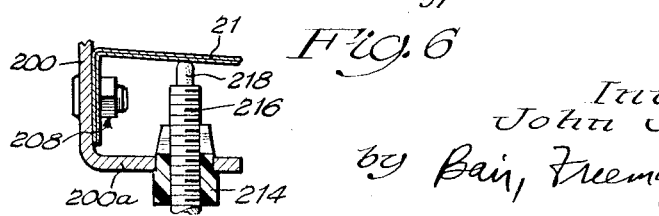

Figures 4 and 5 are views taken respectively on lines 4—4 and 5—5 of Figure 3;

Figure 6 is a fragmentary view showing a detail of the mounting for the control stem that is operated by the manual knob of the control unit;

Figure 7 is a view taken on line 7—7 of Figure 2.

Figure 1:
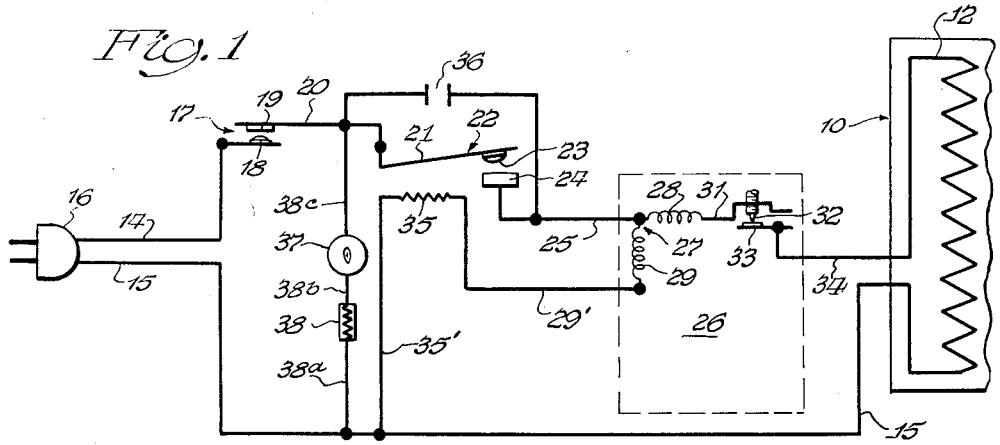
Figure 1 is a schematic diagram of the electrical circuit of a single temperature control unit in accordance with the invention.

Turning now to the drawing, there is shown diagrammatically in Figure 1 an electric blanket 10 having its heating element 12 connected in a circuit which includes wires 14 and 15 extending from a conventional electric service plug 16. One end of heating element 12 is connected directly to one terminal of plug 16 by wire 15. The control for the electric blanket is interposed between wire 14 and the other end of the heating element 12. Said control includes a main on-off switch, a temperature responsive switch, and a switch that is controlled by the magnetic field of a differential relay having magnetically opposed windings.

Referring more specifically to what is shown, the wire 14 is connected to an on-off switch generally indicated at 17, and which comprises contacts 18 and 19. Appropriate means are provided for opening and closing said on-off switch. Contact 19 of switch 17 then connects by wire 20 to a thermostatically controlled, or heat responsive switch, generally indicated at 22. The switch 22 comprises a bimetal member 21 which carries a contact 23 that is adapted to be in circuit closing engagement with a contact 24 when the temperature sensed by the bimetal member 21 is below a preselected level. When the temperature sensed by the bimetal 21 is above said preselected level, the warping of the bimetal member 21 is operative to open switch 22. Although not shown in Figure 1, it is intended that means be provided for varying the preselected temperature level at which switch 22 opens.

Continuing further with what is disclosed in Figure 1, a wire 25 leading from contact 24 of the thermostatically controlled switch 22 is connected to a secondary control unit which comprises a differential relay having a pair of magnetically opposed windings. This secondary control unit is generally indicated at 26. The secondary control unit 26 includes the differential relay aforementioned, generally indicated at 27, said relay including a series winding 28 that is in series with the blanket heating element 12, and a shunt winding 29. Although shown diagrammatically in Figure 1, it is to be understood that the series winding 28 and the shunt winding 29 are arranged so that their magnetic forces oppose each other, and the opposing magnetic forces which are developed by the differential relay are arranged to cooperate with a strategically placed armature to effect operation of a switch, in a manner as hereinafter described.

Leading from the series winding 28 is a line 31 which connects series winding 28 to one contact 32 of said armature operated relay, or switch. The other contact 33 of said switch is carried by the armature which is adapted to be responsive to the magnetic field of the differential relay, and is connected by line 34 to the heater element 12 of the electric blanket 10.

The shunt winding 29 of relay 27 is connected by a line 29a to a resistance 35 and then through a line 35a to wire 15 which leads to the electric service plug 16. Normally, a current limiting ballast is connected in series with the shunt winding 29 as disclosed in Patents 2,636,959 and 2,709,216. Also, normally, a separate heater is provided adjacent the thermostatically controlled switch 22 to operate same. In the instant invention, the ballast 35 which is in series with the shunt winding 29 also serves as the heater adjacent the thermostatically controlled switch 22 for operating said switch 22. This arrangement is a decided improvement over the prior art in that the total number of parts and electrical connections is materially reduced.

The arrangement of heater 35 adjacent switch 22 is such as to cause switch 22 to cycle periodically. Thus, when switch 22 is closed, heater 35 is energized and after sufficient heat is produced by heater 35, switch 22 opens and deenergizes heater 35. After a period of time, switch 22 again closes and the cycle repeats.

In addition to the foregoing described control elements, there is shown a capacitance 36 which is connected across contacts 23 and 24 of switch 22 and which operates to prevent arcing across said switch contacts. Also, an indicator lamp 37 is provided to visually indicate whether the main on-off switch is open or closed. The indicator lamp 37 is shown in series with a current limiting resistor 38 and connected by means of lines 38a, 38b, and 38c between said on-off switch 17 and wire 15. The arrangement is such that the lamp 37 is lighted when switch 17 is closed and remains unlit when switch 17 is open.

Figure 1A:
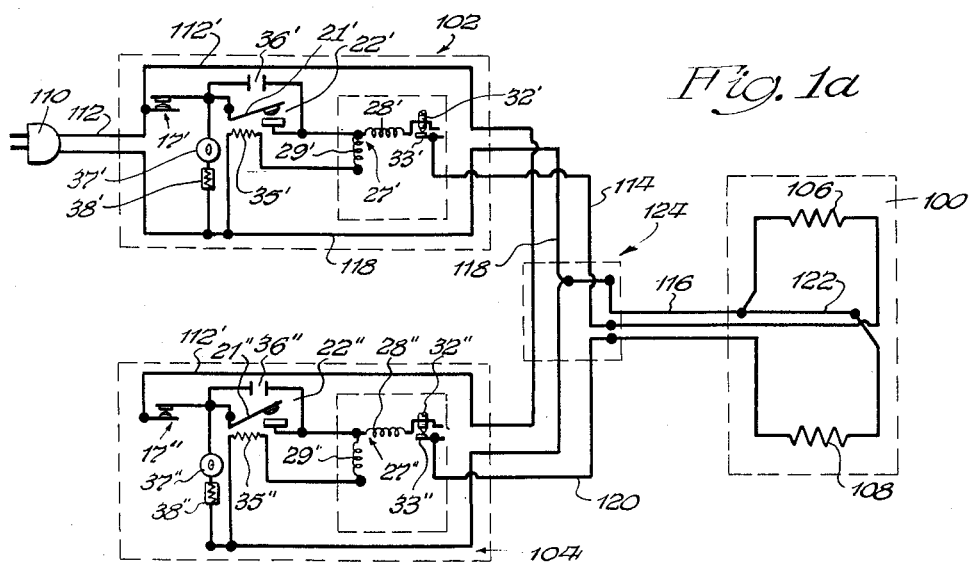
Figure 1a is a schematic diagram of a modified form of the invention, showing the electrical circuit of a dual temperature control embodiment of the invention.

Figure 1a of the drawing shows diagrammatically a modified form of the invention disclosed in Figure 1. It diagrammatically illustrates the manner in which an electric blanket 100 which is provided with two separate heating elements therein, may be selectively controlled by two separate temperature control devices 102 and 104 in accordance with this invention. Control device 102 or 104 is used to control only half of the heated area of blanket 100, control device 102 serving to control heating element 106, and control device 104 serving to control heating element 108.

Only a single socket plug 110 is required. The controls 102 and 104 are connected in parallel to lead 112 extending from plug 110. The energizing circuit for heating element 106 includes plug 110, line 112, through control 102, lead 114, heating element 106, lead 116 and lead 118 back to plug 110. The energizing circuit for heating element 108 includes lead 112, lead 112', through control 104, lead 120, heating element 108, line 122, line 116, and line 118 back to plug 110.

The two control devices are connected through a three-prong connector means 124 to the blanket 100, the three prongs being appropriately arranged to insure proper connection of the connector 124 to blanket 100. The control devices 102 and 104 are similar to the control device disclosed in Figure 1, and similar parts of control 102 are numbered similarly as in Figure 1 with the addition of a prime (') mark on each numeral, and the same is true of control 104 except that the numerals carry a double prime (") mark.

It can be seen that each control device 102 and 104 includes therein substantially the identical control elements disclosed in Figure 1 with the exception that the series winding of each secondary control relay, being shown as winding 28' in control device 102 and as winding 28" as in control device 104, is wound for only half the current load that is carried by the winding 28 of the single blanket relay 27 of Figure 1. This similarity between the single and the dual temperature control devices simplifies manufacturing problems, stock control and the like, and reduces expenses considerably, as it provides for use of identical control chassis for both single as well as dual control sets, except for the electrical cords and attachments thereof and except for the windings of coils 28, 28' and 28".

Referring now to the specific arrangement of parts, and details of construction of a preferred embodiment of the invention, as incorporated in a control chassis therefor, such specific details and arrangement of parts is shown in Figures 2 to 7. The specific control disclosed in Figures 2 to 7 is one which is adapted for a dual control installation of the type as disclosed in Figure 1a. It will be readily appreciated that those parts which are shown in the figures, but which are not needed for a control unit of the type shown in Figure 1, may be omitted.

The entire control mechanism is enclosed in a housing formed by an open sided plastic casing 40 and a closure plate 42 therefor. The control mechanism is subassembled on a mounting plate 44 which fits into the open end of the housing 40. Both the mounting plate 44 and the closure plate 42 are appropriately shaped and dimensioned to fit into a peripheral recess 46 that is formed adjacent the open end of the casing 40, in the manner as shown in Figure 2. Three (3) appropriate threaded bosses 48 are provided, formed integral with housing 40, and are adapted to receive threaded bolts 50 for securing the closure plate 42 and the mounting plate 44 to the housing 40. The housing 40 is appropriately supported by non-scuffing support feet 51 which extend the depth of the housing 40. The front side of the casing 40 is provided with a plurality of apertures which will be hereinafter more fully described.

The entire control disclosed in Figure 1, or control 102 or 104 of Figure 1a, are mounted on the single mounting plate 44. The mounting plate carries two sub-assemblies thereon. One such sub-assembly includes the secondary control 26 which comprises the differential relay 27 and the switch controlled thereby. This sub-assembly is mounted on a first sub-assembly base member 52 which is bolted to mounting plate 44 by a pair of nut-and-bolt assemblies 54. The second sub-assembly includes the on-off switch 17, the thermostatically controlled switch 22, the condenser 36, and the glow lamp 37 and this latter sub-assembly is mounted on a second sub-assembly base member 56 which is located in spaced relation to mounting plate 44 by means of three (3) spacer sleeves 58 and bolts 60 which extend through sleeves 58 to provide for connection to the mounting plate 44.

Referring back to the first sub-assembly, the base 52 carries thereon a first angle shaped bracket 62. The upstanding leg 62a of bracket 62 carries thereon a second angle shaped bracket 64 and a third angle shaped bracket 66. Appropriate bolt means 68 are provided for clamping the adjacent legs of the brackets 62, 64 and 66 together. The extended end of leg 62a of bracket 62 and the adjacent leg of bracket 66 are appropriately apertured to provide for passage therethrough of a contact carrying arm 70. The contact carrying arm 70 is fulcrumed at the point where it passes through and engages leg 62a of bracket 62. One side of the lever arm 70 is connected by means of tension spring 72 to the laterally extending arm 66b of bracket 66. This arrangement provides that the contact 33 which is carried by lever arm 70 is normally biased into engagement with contact 32 by reason of the action of spring 72.

Mounted between the spaced arms 62b and 64b of the brackets 62 and 64 is the differential relay 27. The differential relay 27 is provided with a core member 74 which is positioned opposite a portion of the lever arm 70, and the magnetic flux in core member 74 is adapted to operate on the lever arm 70. When the magnetic flux in core member 74 is such as to overcome the counteracting force of spring 72, then said magnetic flux is operative to pull the lever arm, or armature, 70 to the armature 74 and to thereby effect separation of the contacts 32 and 33.

The leg 64b of bracket 64 carries an insulator member 76 upon which some of the electrical connections are mounted. The insulator member 76 also carries a metal bracket 78 which in turn carries a threaded adjustment member 80. Adjustment member 80 carries the contact 32 on one end thereof, and the other end thereof is provided with a screwdriver slot 82 to permit of adjustment of the threaded member 80 inwardly and outwardly, as, desired, to determine the point at which contact 33 engages contact 32. A tension spring 84 engaging the threaded member 80 prevents inadvertent movement of said member 80.

The second sub-assembly insulator base 56 carries thereon a metal U-shaped bracket 200 which is secured to insulator member 56 by means of a pair of nut and bolt assemblies 202. The bracket 200 is preferably of brass, but may be formed of any good electrical and heat conducting material. The nut and bolt assemblies 202 also operate, through a preformed metal clamp member 204, to clamp the resistor 35 in good heat conducting relation with the metal bracket 200. The metal strap, or clamp member, 204 is formed with an upstanding flange 206 which provides a convenient mounting post for one terminal of the capacitance 36.

The bight of the U-shaped member 200 carries thereon the bimetal member 21 which is bolted thereto by means of nut and bolt assemblies 208. The bimetal 21 is, thus, in electrical and heat conducting relation with the member 200. The insulator member 56 also carries thereon the switch contact 24 which is located within the recess of recessed magnet 210. A connecting post for the contact 204 extends through the insulator 56 and provides a terminal 212 to which the other terminal of capacitance 36 is connected. The use of the magnet 210 is effective to cause the switch 22 to open and close with a snap action.

The free leg 200a of the U-shaped member 200 carries therein a threaded insulator grommet 214 which is adapted to receive a threaded control stem 216. Control stem 216 is provided with an insulated tip 218 which is adapted to engage the bimetal member 21. Through the means of the stems 216 pressing against bimetal 21, additional force may be imposed on bimetal 21, toward keeping the contacts 23 and 24 in engagement, and thus the amount of heat necessary to be sensed by bimetal 21 in order to effect separation of contacts 23 and 24 may be selectively varied. This variable control feature including the threaded stem 216 provides for the user selecting the desired temperature to be attained by the heating element of the blanket and thus affords control by the user as to the desired temperature to be achieved by the electric blanket.

The free arm 200a of the U-shaped bracket 200 provides convenient mounting for the glow lamp 37. There is provided a bracket 220 that is shaped to provide an apertured mounting flange 222 and a slotted mounting flange 224 for receiving the glow lamp 37. The bracket 220 is connected by welding or the like to the bracket 200.

The on-off control is also carried by the insulator base 56. Contact 19 of the on-off switch is carried at the extended end of leg 200a of bracket 200. The bracket 200 serves as the electrical conductor 20 between contact 19 and bimetal 21. Contact 18 of switch 17 is carried by a resilient bracket 226 which is secured to the insulator base 56. The resiliency of bracket 226 normally biases contact 18 in engagement with contact 19.

Bracket 226 presents an upright leg 226a which is to be pressed against in order to effect separation of contacts 18 and 19. An aperture 228 is provided in casing 40 through which an insulator pin 230 is reciprocated to engage leg 226a of bracket 226 to effect opening of switch 17. When the insulator pin 230 is pressed inwardly, the switch is opened. The resiliency of bracket 226 is normally operative to force pin 230 outwardly of the housing 40 to permit closure of switch 17.

The housing 40 is provided with another aperture 232 which is aligned with the slotted head 82 of threaded member 80, so that a screwdriver may be inserted through aperture 232 to effect adjustment of the setting of contact 32 relative to fixed armature 74 so as to selectively vary the point at which the differential relay 27 will be operative to cut off the heating of the blanket.

Control stem 216 is provided with a fluted end 234 which is adapted to meshingly receive a correspondingly fluted control knob which is generally indicated at 236. The meshing flutes between the control knob 236 and stem 234 provides an operative connection for the user. The control knob 236 is of sufficient dimension to overlie the apertures 232 and 228 so as to hide same after assembly has been completed. The control knob 236 is further retained on control stem 216 by means of a threaded bolt 238 which threads into the tapped end of stem 216. An attractive ornamented escutcheon plate 240 is provided for hiding the connecting bolt 238 and is retained in position by means of a plurality of outwardly biased spring arms 242 which may be sprung into recess 244 formed in the control knob 236.

The underside of control knob 236 is provided with a cam 246 formed integrally with the knob 236 and which is adapted to engage the insulated pin 230 to operate same to effect opening of the on-off switch 17 when the control knob is rotated to the off position. The cam 246 includes a sloping portion 246a, a flat portion 246b, and a shoulder 246c. The pin 230 must ride up sloping portion 246a and pass over shoulder 246c, before seating in "off" position on 246b. When the control knob is rotated to a control position, the cam 246 is pivoted away from engagement with pin 230 and the resiliency of bracket 226 is operative to effect closing of switch 17.

The knob 236 also carries a finger 248 located radially inwardly of cam 246 and which is adapted to engage opposite sides of a stop member 250 carried by casing 40. The finger 248 and stop 250 cooperate to define stop means for limiting the range of rotation of the control knob 236. The selective rotation of the control knob 236 is operative to impose greater or lesser force on bimetal 21 to adjust for the heat that is to be achieved by the blanket which is connected to the control device herein.

The glow tube 37 is located opposite an aperture in the casing 40, through which light from the glow tube 37 passes for the purpose of illuminating and thereby indicating the position of the control dial, said dial being preferably made of a translucent plastic. Indicia is provided on control knob 236 which is adapted to be aligned with glow tube 37 to indicate what relative heat is being supplied by the control.

From the foregoing description of the invention herein, it will be seen that there has been provided an improved control for a heating blanket or the like. The new control cycles on and off repeatedly, both before and after a "cut-off" by the differential relay. Thus, the recycling serves to re-set the differential relay from its cut-off position, whereas in certain previous designs, once the differential relay was "cut-off," no further energization of the heating blanket occurred.

Secondly, the new control of this invention provides for a simple continuous, stepless, screw-type calibration of the differential relay, which serves as an improvement in the calibration of the relay since in previous controls such calibration was effected by use of rheostats which are much more complicated structurally.

Thirdly, the new control may be calibrated completely from the outside of the assembled control, as the design provides access to the calibration adjustments simply by removing the control knob.

Fourth, because of the fact that there is continual cycling by the switch 22, the various elements of the heating blanket may be connected in any sequence whatsoever and the heating blanket will still operate. This improvement is contrasted with certain of previous appliances which require a specific sequence of connection of the control to the heating blanket in order to achieve operation of the blanket.

Respecting the continuous stepless control of the differential relay provided by the screw element 80, previous designs used a fixed relay gap between the armature of the differential relay's coils and the arm which carried the movable contact, and a variable rheostat was provided for varying the flux at which the differential relay operated. By providing the simple stepless control achieved by screw element 80, the cut-off point of the differential relay may be accurately varied and eliminates the rheostat adjustment which previous controls had employed.

It will be readily seen from the foregoing, that merely by removing the control knob 236, one has access through hole 232 to the threaded member 80, and the arrangement of parts is such that the control knob 236 may be accurately positioned respecting the threaded control stem 216. Thus, factory adjustment of the entire control herein disclosed may be effected without disassembling the chassis from the housing.

In effecting an adjustment of a completed control, the control knob 236 is removed and an operator turns control shaft 216 until he hears the audible "click" which occurs when the contacts 23 and 24 are first closed, said contacts closing with a snap action by reason of the presence of the magnet 210. The operator then consults a prepared chart which shows what setting the control knob 236 should be at for the room temperature at which the "click" occurred, and by assembling the control knob 236 on the shaft 216 at the required setting, the control is automatically calibrated, and the cam 246 is also automatically located with respect to the on-off switch which it is to control, and the control will thereafter operate in conformity with the indicia carried by the control knob 236. Of course, any adjustment of screw member 80 may be effected prior to reassembly of the control knob 236.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A temperature control unit for an energizing circuit comprising a temperature responsive element, first circuit contacts in said energizing circuit controlled by said temperature responsive element, a differential relay having a pair of magnetically opposed windings, said windings being connected through a common terminal in series with said first circuit contacts, a heating element connected in series with one of said windings and serving as a ballast resistance therefor, said heating element and said one winding being connected in parallel to said energizing circuit, so that only a portion of all electric current passing through said first pair of contacts, when said pair of contacts is closed, passes through said heating element, said heating element also serving to heat said temperature responsive element to cause the same to cycle, and second circuit contacts in said energizing circuit connected in series with the other of said windings and controlled by the relative magnetic forces produced by the opposed windings of the differential relay.

2. A temperature control unit for an energizing circuit of an electric warming blanket comprising a temperature responsive bimetal element, a first pair of contacts in said energizing circuit controlled by said bimetal element, said contacts being normally closed for energizing the energizing circuit for said blanket, a differential relay having a pair of magnetically opposed windings, said windings being connected through a common terminal in series with said first circuit contacts, a heating element connected in series with one of said windings for limiting current flow therethrough and operatively associated with said temperature responsive bimetal element for causing the same to cyclically open said first pair of contacts, said heating element and said one winding being connected in parallel to said energizing circuit, so that only a portion of all electric current passing through said first pair of contacts, when said pair of contacts is closed, passes through said heating element, and a second pair of contacts in said energizing circuit connected in series with the other of said windings and controlled by the relative magnetic forces produced by the opposed windings of the differential relay for completing an electrical circuit to said warming blanket.

3. A temperature control unit for an energizing circuit, comprising a bimetal member, a first pair of contacts in said energizing circuit controlled by said bimetal member, a differential relay having first and second magnetically opposed windings in circuit with said first pair of contacts, the second winding being connected in series with the energizing circuit, a heating element connected in series with said first winding and arranged for heating said bimetal member to cyclically open and close said first pair of contacts, said heating element and first winding being connected in parallel to said energizing circuit, whereby said heating element also serves as a current limiting ballast for said first winding, so that only a portion of all electric current passing through said first pair of contacts, when said pair of contacts is closed, passes through said heating element, a second pair of contacts in said energizing circuit connected in series with said second winding, and adapted to be opened and closed in response to the relative magnetic forces produced by said windings, a magnetic force being produced in said first winding only upon closure of said first pair of contacts and a magnetic force being produced in said second winding only upon closure of both of said first and second pair of contacts, and means for mechanically varying the amount of magnetic force required to open said second pair of contacts.

4. A temperature control unit for an energizing circuit of an electric warming blanket comprising a bimetal member, a first pair of contacts in said energizing circuit controlled by said bimetal member, a differential relay having first and second magnetically opposed windings in circuit with said first pair of contacts, a heating element connected in series with said first winding and arranged for heating said bimetal member to cyclically open and close said first pair of contacts, said heating element and first winding being connected in parallel to said energizing circuit, whereby said heating element also serves as a current limiting ballast for said first winding, a condenser connected across said first pair of contacts for reducing arcing thereacross, a second pair of contacts in said energizing circuit connected in series with said second winding, and adapted to be opened and closed in response to the relative magnetic forces produced by said windings, a magnetic force being produced in said first winding only upon closure of said first pair of contacts and a magnetic force being produced in said second winding only upon closure of both of said first and second pair of contacts, and adjustable mechanical means, adjustable over a continuous range, connected to one of said second pair of contacts for selectively varying the relative magnetic forces required to open and close said second pair of contacts.

5. A temperature control unit for an energizing circuit comprising a housing, a heat responsive bimetal member disposed within said housing, a first pair of contacts in said energizing circuit controlled by said bimetal member, first mechanically adjustable means extending through said housing and in operable engaging relation with said bimetal member for varying the amount of heat required for opening said first pair of contacts, a differential relay having first and second magnetically opposed windings in circuit with said first pair of contacts, a heating element connected in series with said first winding for limiting current flow therethrough and arranged for heating said bimetal member to cyclically open and close said first pair of contacts, said heating element and first winding being connected in parallel to said energizing circuit, a second pair of contacts in said energizing circuit connected in series with said second winding, spring means normally holding said second pair of contacts closed, said second pair of contacts adapted to be opened in responses to a predetermined difference between the magnetic forces produced by said first and second windings, and second mechanically adjustable means for varying the amount of magnetic force required to open said second pair of contacts.

6. An electric warming blanket control comprising a pair of temperature control units, each of said units including a bimetal member, a first pair of contacts controlled by said bimetal member, a differential relay having first and second magnetically opposed windings in circuit with said first pair of contacts, a heating element connected in series with said first winding for limiting current flow therethrough and arranged for heating said bimetal member to cyclically open and close said first pair of contacts, a second pair of contacts connected in series with said second winding, and arranged to be opened and closed in response to the relative magnetic forces produced by said windings, and means for mechanically varying the amount of magnetic force required to open said second pair of contacts, and means connecting each of said temperature control units to individual heating circuits in said electric warming blanket.

7. A control for an electric blanket having a pair of individual heating elements therein, which heating elements have a common lead therefor, said control comprising a single plug for connection to a source of power, a pair of control units connected in parallel across said source of power and connected one each to said heating elements, and each control unit comprising a bimetal member, a first pair of contacts controlled by said bimetal member, a differential relay having first and second magnetically opposed windings in circuit with said first pair of contacts, a heating element connected in series with said first winding for limiting current flow therethrough and also arranged for heating said bimetal member to cyclically open and close said first pair of contacts, a second pair of contacts connected in series with said second winding and arranged to be opened and closed in response to the relative magnetic forces produced by said windings, means for selectively determining the amount of magnetic force required to open said second pair of contacts, and means for selectively determining the amount of heat required to open said first pair of contacts.

8. A temperature control unit comprising a first set of normally closed contacts adapted to be opened at a predetermined temperature, a second pair of normally closed contacts arranged to be opened by a magnetic differential relay at a predetermined magnetic force, a third set of normally closed contacts constituting an on-off switch, a first control means for selectively varying, over a continuous range, the temperature at which the first set of contacts open, a second control means for selectively varying, over a continuous range, the amount of magnetic force required to open said second pair of contacts, all three pairs of contacts being enclosed in a housing, means in said housing defining an opening affording access to said second control means, a third control means arranged for reciprocation for actuating said on-off switch at a predetermined point relative to the selected range of temperatures at which the first set of contacts is to be operative, a rotatable control knob operatively associated with said first control means, cam means carried by said control knob for actuating said third control means, and said control knob being of sufficient size to overlie the access opening to said second control means.

9. A temperature control unit comprising a first set of normally closed contacts adapted to be opened at a predetermined temperature, a second pair of normally closed contacts arranged to be opened by a magnetic differential relay at a predetermined magnetic force, a third set of normally closed contacts constituting an on-off switch, a first control means for selectively varying, over a continuous range, the temperature at which the first set of contacts open, a second control means for selectively varying, over a continuous range, the amount of magnetic force required to open said second pair of contacts, all three pairs of contacts being enclosed in a housing, means in said housing defining an opening affording access to said second control means, a third control means arranged for reciprocation for actuating said on-off switch at a predetermined point relative to the selected range of temperatures at which the first set of contacts is to be operative, a rotatable control knob operatively associated with said first control means, cam means carried by said control knob for actuating said third control means, said control knob being of sufficient size to overlie the access opening to said second control means, and stop means for limiting the range of rotation of said control knob.

References Cited in the file of this patent

UNITED STATES PATENTS

| | | |
|---|---|---|
| 2,279,214 | Veinott | Apr. 7, 1942 |
| 2,320,252 | Vaughan | May 25, 1943 |
| 2,636,959 | Huck | Apr. 28, 1953 |
| 2,704,803 | Crowley et al. | Mar. 22, 1955 |
| 2,709,216 | Moran et al. | May 24, 1955 |
| 2,784,289 | Huck | Mar. 5, 1957 |
| 2,794,896 | Huck | June 4, 1957 |
| 2,801,317 | Goldmuntz et al. | July 30, 1957 |